US010960796B2

(12) United States Patent
Tsugawa et al.

(10) Patent No.: US 10,960,796 B2
(45) Date of Patent: Mar. 30, 2021

(54) SEAT PAD

(71) Applicant: BRIDGESTONE CORPORATION, Chuo-ku Tokyo (JP)

(72) Inventors: Yukiko Tsugawa, Yokohama (JP); Taisuke Yonezawa, Yokohama (JP); Yoshiyuki Takahashi, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/464,017

(22) PCT Filed: Nov. 22, 2017

(86) PCT No.: PCT/JP2017/042092
§ 371 (c)(1),
(2) Date: May 24, 2019

(87) PCT Pub. No.: WO2018/097208
PCT Pub. Date: May 31, 2018

(65) Prior Publication Data
US 2019/0343296 A1    Nov. 14, 2019

(30) Foreign Application Priority Data
Nov. 25, 2016   (JP) .............................. JP2016-228952

(51) Int. Cl.
*B60N 2/56*    (2006.01)
*A47C 27/15*   (2006.01)

(52) U.S. Cl.
CPC ............ *B60N 2/5664* (2013.01); *A47C 27/15* (2013.01)

(58) Field of Classification Search
CPC .... B60N 2/5664; B60N 2/5642; B60N 2/565; B60N 2/5657
See application file for complete search history.

(56) References Cited

U.S. PATENT DOCUMENTS

| | | | |
|---|---|---|---|
| 7,533,941 B2* | 5/2009 | Saitou .................. | B60N 2/5621 297/452.27 |
| 8,864,238 B2* | 10/2014 | Oota ................... | B29C 44/1285 297/452.42 |
| 9,901,181 B2* | 2/2018 | Miyata .................. | A47C 27/22 |
| 10,266,082 B2* | 4/2019 | Noguchi .................. | A47C 7/74 |

(Continued)

FOREIGN PATENT DOCUMENTS

| CN | 202800867 U | 3/2013 |
|---|---|---|
| CN | 104116350 A | 10/2014 |

(Continued)

OTHER PUBLICATIONS

Feb. 27, 2018, International Search Report issued in the International Patent Application No. PCT/JP2017/042092.

(Continued)

*Primary Examiner* — Timothy J Brindley
(74) *Attorney, Agent, or Firm* — Kenja IP Law PC

(57) ABSTRACT

A seat pad 10 comprises a cushion pad 11 as a seat portion to be sat on, wherein a high ventilation member 12 higher in ventilation property than a cushion pad member forming the cushion pad 11 is embedded in a part of the cushion pad 11 except a under-hip portion located under hips when sitting, in a state of being exposed only to a rear side of the cushion pad.

18 Claims, 3 Drawing Sheets

(56) References Cited

U.S. PATENT DOCUMENTS

| | | | |
|---|---|---|---|
| 2013/0025065 A1* | 1/2013 | Chunglo | A47C 21/046 5/691 |
| 2013/0025069 A1* | 1/2013 | Ruehlmann | A47C 27/15 5/740 |
| 2013/0025070 A1* | 1/2013 | Ruehlmann | A47C 27/15 5/740 |
| 2015/0158214 A1* | 6/2015 | Mogi | B29C 44/1276 264/46.4 |
| 2015/0158405 A1* | 6/2015 | Miyata | B60N 2/5642 297/180.1 |
| 2016/0220028 A1 | 8/2016 | Miyata et al. | |
| 2017/0043695 A1* | 2/2017 | Kitamoto | B60N 2/5657 |
| 2019/0014906 A1* | 1/2019 | Yoshitomi | C08G 18/632 |
| 2019/0054847 A1* | 2/2019 | Lang | B60N 2/50 |
| 2019/0343296 A1* | 11/2019 | Tsugawa | B60N 2/70 |

FOREIGN PATENT DOCUMENTS

| | | | | |
|---|---|---|---|---|
| CN | 105530838 A | | 4/2016 | |
| JP | 3019354 B2 | | 3/2000 | |
| JP | 2001000281 A | * | 1/2001 | |
| JP | 2003145631 A | * | 5/2003 | |
| JP | 2006042985 A | | 2/2006 | |
| JP | 2007330459 A | | 12/2007 | |
| JP | 2009291537 A | | 12/2009 | |
| JP | 2010166943 A | * | 8/2010 | |
| JP | 3174096 U | | 3/2012 | |
| JP | 2015159905 A | | 9/2015 | |
| WO | WO-2015178135 A1 | * | 11/2015 | ....... B29C 45/14065 |

OTHER PUBLICATIONS

May 28, 2019, International Preliminary Report on Patentability issued in the International Patent Application No. PCT/JP2017/042092.

Mar. 5, 2020, search result of the Extended European Search Report issued by the European Patent Office in the corresponding European Patent Application No. 17873674.0.

Nov. 4, 2020, search result of Office Action issued by the China National Intellectual Property Administration in the corresponding Chinese Patent Application No. 201780072624.6.

* cited by examiner

SEAT PAD

TECHNICAL FIELD

The present disclosure relates to a seat pad.

BACKGROUND

As seat pads which are structures that form seats, for example, seat pads used for automobile seats are known. A seat pad used for an automobile seat needs to have appropriate hardness and softness in order to stably maintain the sitting posture of a seated occupant while ensuring comfortable sitting, and therefore is made of, for example, foam such as flexible polyurethane foam.

The body temperature of the occupant sitting on the automobile seat is transmitted to the automobile seat. In the case where heat dissipation from the seat pad is insufficient, the transmitted body temperature inevitably makes the seat pad hot. Besides, in the case where the automobile is parked at high outside air temperature such as in the hot weather, the automobile seat reaches high temperature with a temperature increase inside the automobile, which inevitably makes the seat pad hot.

When the seat pad of the automobile seat is hot, the occupant sitting on the automobile seat is constantly exposed to the heat of the seat pad, and feels discomfort. As a result, the riding comfort of the occupant decreases.

To address such situations in which the foam becomes hot, for example, a pillow made of foam and having heat dissipation cavities has been proposed (see PTL 1).

CITATION LIST

Patent Literature

PTL 1: JP 3174096 U

SUMMARY

Technical Problem

However, for example in the case where heat dissipation cavities are formed to reduce heat in the seat pad made of foam, spaces created inside the seat pad make it difficult to stably maintain the sitting posture of the seated occupant while ensuring comfortable sitting. In particular, the sitting comfort decreases inevitably.

It could therefore be helpful to provide a seat pad that can dissipate heat efficiently without a decrease in riding comfort of a seated occupant.

Solution to Problem

A seat pad according to the present disclosure is a seat pad comprising a cushion pad configured to be a seat portion to be sat on, wherein a high ventilation member higher in ventilation property than a cushion pad member forming the cushion pad is embedded in a part of the cushion pad except a under-hip portion configured to be located under hips when sitting, in a state of being exposed only to a rear side of the cushion pad.

Advantageous Effect

It is thus possible to provide a seat pad that can dissipate heat efficiently without a decrease in riding comfort of a seated occupant.

DETAILED DESCRIPTION

One of the disclosed embodiments will be described below, with reference to drawings.

Figure 1A:
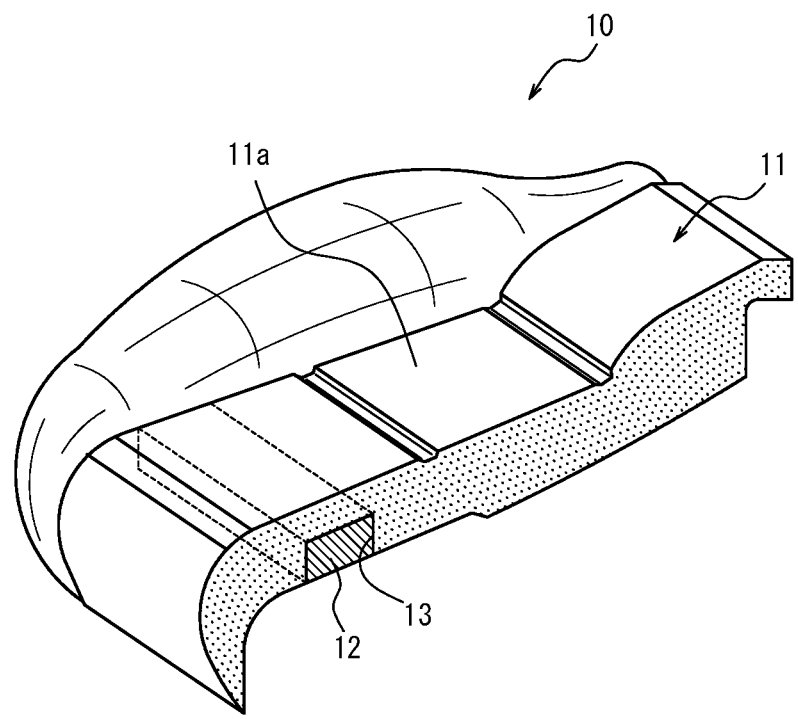
FIG. 1A is a perspective view schematically illustrating the structure of a cushion pad in a seat pad according to one of the disclosed embodiments, cut along a front-back direction line approximately at a width direction center portion of the cushion pad.
Figure 1B:
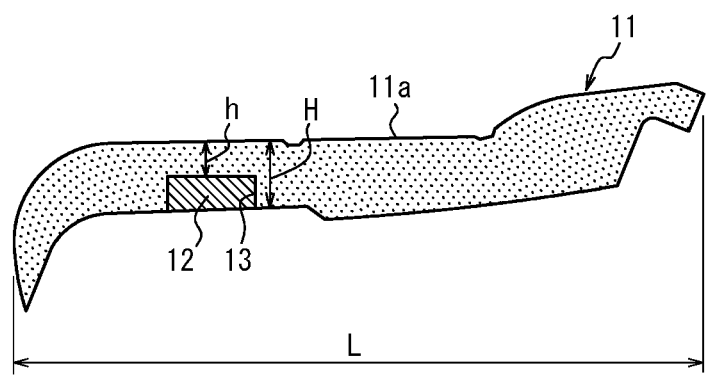
FIG. 1B is a sectional view schematically illustrating the structure of the cushion pad in the seat pad according to one of the disclosed embodiments, along the front-back direction line of the cushion pad in FIG. 1A.

As illustrated in FIGS. 1A and 1B, a seat pad 10 in this embodiment includes a cushion pad 11 configured to be a seat portion on which an occupant sits, and a back pad (not illustrated) configured to be a backrest portion for supporting the occupant's back when sitting. The seat pad 10 is attached to a seat frame (not illustrated), covered with a cover material (not illustrated), and installed, for example, in a vehicle such as an automobile as a seat on which the occupant sits.

In this embodiment, a high ventilation member 12 higher in ventilation property than a cushion pad member forming the cushion pad 11 is embedded in a part of the cushion pad 11 except a under-hip portion located under the hips when sitting, in a state of being exposed only to the rear side of the cushion pad 11.

The under-hip portion of the cushion pad 11 is a portion that supports a load on the cushion pad 11. For example in the case where the cushion pad 11 in this embodiment is included in the seat pad 10 installed in an automobile as a seat on which an occupant sits, the under-hip portion of the cushion pad 11 is a part of the cushion pad 11 on which the hips of the seated occupant are located and that includes at least a region between parts on which the ischial tuberosities of the seated occupant are located. The body weight of the occupant sitting on the seat pad 10 is mainly supported by the ischial tuberosities located on a flat surface portion 11a occupying a width direction center portion of the cushion pad 11 and serving as a seat surface.

Herein, "width direction" is a direction of the seat pad 10 installed in the automobile along the automobile width direction, "front-back direction" is a direction of the seat pad 10 installed in the automobile along the automobile front-back direction, and "up-down direction" is a direction of the seat pad 10 installed in the automobile along the automobile up-down direction.

The cushion pad member forming the cushion pad 11 in this embodiment is formed using foamed synthetic resin such as polyurethane foam, e.g. polyurethane foam with a density of 45 kg/m$^3$ to 75 kg/m$^3$. This polyurethane foam is not subjected to membrane removal treatment, and has, for example, a 25% hardness of 200 N/200φ to 300 N/200φ (in accordance with JIS K 6400-2) and a ventilation rate of 100 cc/cm$^2$/sec or less.

The high ventilation member 12 in this embodiment is formed, for example, in a horizontally long rectangular parallelepiped shape approximately across the entire width of the flat surface portion 11a of the cushion pad 11, and contained in a recessed space 13 formed in the cushion pad 11 to correspond to the high ventilation member 12.

The high ventilation member 12 in this embodiment is formed using foamed synthetic resin such as polyurethane foam, e.g. polyurethane foam with a density of 20 kg/m$^3$ to 40 kg/m$^3$ and more preferably 20 kg/m$^3$ to 30 kg/m$^3$ and a number of cells of 45 cells or less per 25 mm and more preferably 25 cells or less per 25 mm, and preferably 5 cells or more per 25 mm and more preferably 10 cells or more per 25 mm. This polyurethane foam has, for example, a 25% hardness of 50 N/200φ to 90 N/200φ (in accordance with JIS K 6400-2) and a ventilation rate of 150 cc/cm$^2$/sec to 1000 cc/cm$^2$/sec. These are values when the high ventilation member 12 is not inserted in the cushion pad 11 (i.e. in its natural state and not in the below-described compressed state).

As a result of the density of the polyurethane foam being 20 kg/m$^3$ to 40 kg/m$^3$, heat capacity can be reduced while maintaining sitting comfort and riding comfort. As a result of the number of cells of the polyurethane foam being 45 cells or less per 25 mm, a sufficient ventilation rate is ensured, and heat can be dissipated from the seat pad efficiently. If the density of the polyurethane foam is less than 20 kg/m$^3$, sitting comfort and riding comfort are adversely affected. If the density is more than 40 kg/m$^3$, higher heat capacity than in the case of using conventional urethane foam hinders heat dissipation. If the number of cells is more than 45 cells per 25 mm, a sufficient ventilation rate for heat dissipation cannot be ensured.

The polyurethane foam used as the high ventilation member 12 in this embodiment is polyurethane foam subjected to membrane removal treatment for removing foam membranes, i.e. polyurethane foam with only a skeleton. Such polyurethane foam subjected to membrane removal treatment facilitates replacement of air in a natural ventilation state as compared with polyurethane foam not subjected to membrane removal treatment, thus enabling efficient ventilation. High ventilation property in typical use environments of the seat pad 10 can therefore be ensured.

The polyurethane foam used as the high ventilation member 12 in this embodiment has higher ventilation property than the polyurethane foam used as the cushion pad member forming the cushion pad 11.

The thickness of the high ventilation member 12 in this embodiment in the up-down direction is preferably 20% or more of the total thickness of the cushion pad 11 and the high ventilation member 12 at the position where the high ventilation member 12 is embedded, more preferably 30% to 90% of the total thickness, and further preferably 70% to 90% of the total thickness. The thickness of the high ventilation member 12 in the up-down direction in this embodiment is the thickness when the occupant is not seated on the cushion pad 11. For example, when the thickness of the high ventilation member 12 is 50 mm, the thickness of the cushion pad 11 covering the high ventilation member 12, i.e. the distance h (see FIG. 1B) from the upper surface of the high ventilation member 12 to the upper surface of the cushion pad 11, is preferably at least about 5.6 mm.

The recessed space 13 in this embodiment is formed in the cushion pad 11 in a horizontally long rectangular parallelepiped shape approximately across the entire width of the flat surface portion 11a to correspond to the shape of the high ventilation member 12, and is open only to the rear side of the cushion pad 11. The high ventilation member 12 in this embodiment is inserted in the recessed space 13 in the seat pad 10 (the cushion pad 11 in this embodiment), in a state of being compressed in a planar view lateral direction of the high ventilation member 12. Thus, the high ventilation member 12 in this embodiment is embedded in the seat pad 10 in a state of being exposed only to the rear side of the seat pad 10.

Herein, the planar view lateral direction of the high ventilation member 12 is a direction orthogonal to the longitudinal direction of the high ventilation member 12 in a planar view. In FIG. 1B, the planar view lateral direction of the high ventilation member 12 is the right-left direction of the drawing.

The compression ratio when compressing the high ventilation member 12 in this embodiment is, for example, preferably 20% or less of the entire length of the high ventilation member 12 in the planar view lateral direction, and more preferably 5% to 10% of the entire length.

In this embodiment, by compressing the high ventilation member 12 in the planar view lateral direction of the high ventilation member 12 when inserting the high ventilation member 12 into the recessed space 13 in the seat pad 10 (the cushion pad 11 in this embodiment), the high ventilation member 12 is prevented from being deformed, and also prevented from falling off the recessed space 13 of the seat pad 10.

The recessed space 13 in this embodiment is formed in a region on the front end side of the part (the under-thigh portion of the cushion pad 11) of the flat surface portion 11a as the seat surface on which the thighs of the seated occupant are located, i.e. on the front end side of the flat surface portion 11a except the under-hip portion for the occupant.

Hence, in this embodiment, the high ventilation member 12 inserted in the recessed space 13 and embedded in the cushion pad 11 is located in a region on the front end side of the part (the under-thigh portion of the cushion pad 11) of the flat surface portion 11a as the seat surface on which the thighs of the seated occupant are located, i.e. on the front end side of the flat surface portion 11a except the under-hip portion for the occupant. The under-hip portion, in particular the part on which the ischial tuberosities of the seated occupant are located, is a part for supporting the body weight of the occupant, and is a region that affects the riding comfort of the occupant. Accordingly, by providing the high ventilation member 12 in the range of the flat surface portion 11a except the part on which the ischial tuberosities of the occupant are located, the riding comfort of the occupant is least affected.

More specifically, the position of the high ventilation member 12 is preferably within a region extending from the front end of the cushion pad 11 and having a length of 40% of the length L (see FIG. 1B) of the cushion pad 11 in the front-back direction, and more preferably within a region extending from the front end of the cushion pad 11 and having a length of 35% of the length L. Such a region is away from the region that affects the riding comfort of the seated occupant, and therefore the riding comfort of the occupant is least affected.

The number of high ventilation members 12 may be two or more.

Thus, in the seat pad 10 in this embodiment, the high ventilation member 12 higher in ventilation property than the cushion pad member forming the cushion pad 11 is embedded only on the front end side of the part (under-thigh portion) of the flat surface portion 11a as the seat surface of the cushion pad 11 on which the thighs of the seated occupant are located, in a state of being exposed only to the rear side of the cushion pad 11.

The seat pad 10 in this embodiment having such a structure can dissipate heat from the rear side of the cushion pad 11 efficiently, even in the case where the seat pad 10 becomes hot as a result of the body temperature of the occupant sitting on the seat pad 10 being transmitted to the seat pad 10 or as a result of the automobile seat reaching high temperature with a temperature increase inside the automobile when the automobile is parked at high outside air temperature such as in the hot weather. That is, the seat pad 10 in this embodiment can efficiently dissipate heat in the seat pad 10 made of polyurethane foam which is a material that is hard to cool and easily becomes hot, through the high ventilation member 12 of the cushion pad 11.

As a result of the thickness of the high ventilation member 12 being 20% or more of the total thickness of the cushion pad 11 and the high ventilation member 12 at the position where the high ventilation member 12 is embedded, heat in the cushion pad 11 can be dissipated efficiently while ensuring riding comfort. Hence, heat can be dissipated from the seat pad further efficiently.

The high ventilation member 12 in this embodiment is located on the front end side of the part (under-thigh portion) of the flat surface portion 11a as the seat surface on which the thighs of the seated occupant are located.

The movement of the under-thigh portion of the flat surface portion 11a is greater than the movement of the under-hip portion during running, for example. Since the frequency of compression and release of the cushion pad 11 is high, the pumping effect is facilitated. This contributes to significant effect of discharging hot air inside the cushion pad 11 including the high ventilation member 12 to the outside. Hence, heat can be dissipated from the cushion pad 11 efficiently, with it being possible to cool the cushion pad 11 easily. In other words, as a result of embedding the high ventilation member 12 only in the under-thigh portion of the cushion pad 11 located under the thighs of the seated occupant, heat can be dissipated from the cushion pad 11 efficiently.

Thus, the cushion pad 11 in the seat pad 10 in this embodiment is easy to cool, and therefore the seat pad 10 can be kept from becoming hot. This prevents situations in which the seated occupant feels discomfort as a result of the seat pad 10 becoming hot and consequently the sitting comfort of the occupant and the riding comfort of the occupant decrease. Particularly when cooling the automobile interior by an air conditioner, the automobile interior can be cooled efficiently, and the cooling effect can be enhanced. The seat pad 10 in this embodiment is therefore more effective in the case where the automobile is parked in the hot weather or the like and the automobile seat reaches high temperature.

Moreover, the high ventilation member 12 is embedded in the cushion pad 11 on the front end side of the part (under-thigh portion) of the flat surface portion 11a on which the occupant's thighs are located. There is no space inside the cushion pad 11 made of foam in the under-hip portion and in particular the part on which the ischial tuberosities of the seated occupant are located, and polyurethane foam is provided in all of the part (under-thigh portion) of the flat surface portion 11a as the seat surface on which the occupant's thighs are located and the under-hip portion. This prevents situations in which, due to a space formed inside the cushion pad 11, it is difficult to stably maintain the sitting posture of the seated occupant while ensuring comfortable sitting. The sitting comfort of the occupant and the riding comfort of the occupant are therefore not impaired.

Although the high ventilation member 12 embedded in the cushion pad 11 is exposed only to the rear side of the cushion pad 11 in this embodiment, the high ventilation member 12 may communicate with the front side (upper surface) of the cushion pad 11 through one or more narrow communication holes.

EXAMPLES

Cushion pads for a seat pad according to the present disclosure were produced experimentally (Examples), and their temperature changes with time were compared with those of Comparative Examples.

A cushion pad of Example a has a structure in which the high ventilation member 12 is embedded in the under-thigh portion of the cushion pad (see FIGS. 1A and 1B). Various properties of the high ventilation member 12 are listed in Table 1. In Table 1, the total thickness denotes the total thickness of the cushion pad 11 and the high ventilation member 12 at the position where the high ventilation member 12 is embedded, and, for example, is 5.0 cm when the thickness of the cushion pad 11 is 1.5 cm and the thickness of the high ventilation member 12 is 3.5 cm. The measurement method for 25% hardness complies with JIS K 6400-2, and the thickness is 50 mm.

In Example a, the high ventilation member 12 embedded in the cushion pad is exposed only to the rear side of the cushion pad (see FIGS. 1A and 1B). In the below-described Example b, Example c, and Comparative Example G, too, the high ventilation member 12 is exposed only to the rear side of the cushion pad.

TABLE 1

| | |
|---|---|
| Thickness | About 70% of total thickness |
| Density | 30 kg/m$^3$ |
| 25% hardness | 70 N/200φ |
| Number of cells | 16 cells per 25 mm |
| Ventilation rate | 492 cc/cm$^2$/sec |

A cushion pad of Comparative Example X is made only of polyurethane foam as a cushion pad member, without a high ventilation member of Examples.

Changes in the temperature (° C.) inside the cushion pad of each of Example a (density: 30 kg/m$^3$), Example b (density: 21 kg/m$^3$), Example c (density: 40 kg/m$^3$), and Comparative Example X with time (min) are illustrated in a graph (FIG. 2) and listed in a table (Table 2). In Example b, the number of cells is 16 cells per 25 mm, and the thickness is about 70% of the total thickness. In Example c, the number of cells is 16 cells per 25 mm, and the thickness is about 70% of the total thickness. Examples a, b, and c have the same number of cells and the same thickness, and differ in density.

TABLE 2

|  |  | Time (min) | | |
| --- | --- | --- | --- | --- |
|  |  | 0 | 10 | 15 |
| Temperature (° C.) | Comparative Example X | 58.2 | 50.6 | 46.6 |
|  | Example a | 56.6 | 45.7 | 41.4 |
|  | Example b | 56.2 | 44.1 | 41.1 |
|  | Example c | 55.9 | 46.9 | 43.1 |

Figure 2:
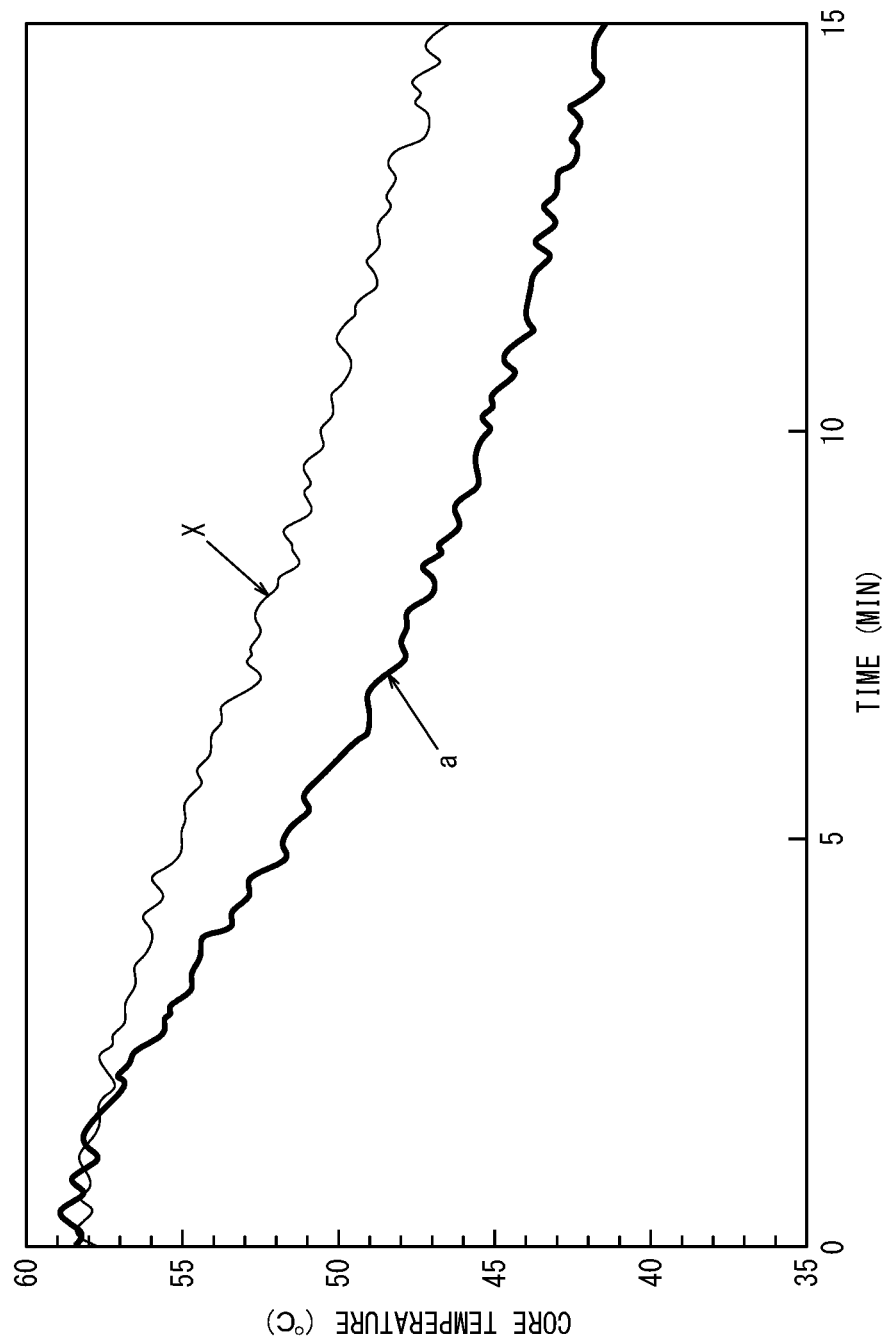
FIG. 2 is a graph illustrating temperature changes in the cushion pad in FIGS. 1A and 1B with time for Example and Comparative Example.

As can be seen from FIG. 2 and Table 2, the temperature decrease of the cushion pad was 10.9 (° C.) in elapsed time 0 to 10 (min) and 4.3 (° C.) in elapsed time 10 to 15 (min) in Example a, and 7.6 (° C.) in elapsed time 0 to 10 (min) and 4.0 (° C.) in elapsed time 10 to 15 (min) in Comparative Example X. As can be seen from Table 2, the temperature decrease of the cushion pad in elapsed time 0 to 10 (min) was 12.1 (° C.) in Example b and 9.0 (° C.) in Example c, and the temperature decrease of the cushion pad in elapsed time 10 to 15 (min) was 3.0 (° C.) in Example b and 3.8 (° C.) in Example c. The temperature decrease after 15 (min) was 15.2 (° C.) in Example a, 15.1 (° C.) in Example b, and 12.8 (° C.) in Example c, whereas the temperature decrease after 15 (min) was 11.6 (° C.) in Comparative Example X.

Thus, each of the cushion pads of Example a using the high ventilation member 12 with a density of 30 kg/m$^3$, Example b using the high ventilation member 12 with a density of 21 kg/m$^3$, and Example c using the high ventilation member 12 with a density of 40 kg/m$^3$ reached a lower temperature than the cushion pad of Comparative Example X without a high ventilation member (Example a: 41.4° C., Example b: 41.1° C., Example c: 43.1° C., against Comparative Example X: 46.6° C.), involving an initial rapid temperature decrease (Example a: 10.9° C., Example b: 12.1° C., Example c: 9.0° C., against Comparative Example X: 7.6° C.). In particular, Example a with a density of 30 kg/m$^3$ and Example b with a density of 21 kg/m$^3$ achieved a considerable temperature decrease of more than 15° C. from the initial temperature.

Next, temperature changes (initial temperature: 60 (° C.), after 15 min) of the cushion pad 11 (having the high ventilation member 12 embedded in a part other than the under-hip portion so as to be exposed only to the rear side of the cushion pad) of the seat pad 10 according to the present disclosure in the case of changing the number of cells of the high ventilation member 12 (see FIG. 3A) and in the case of changing the thickness of the high ventilation member 12 (see FIG. 3B) were examined. Each value indicating the thickness of the high ventilation member 12 given below is the proportion (%) to the total thickness of the cushion pad 11 and the high ventilation member 12 at the position where the high ventilation member 12 was embedded.

Figure 3A:
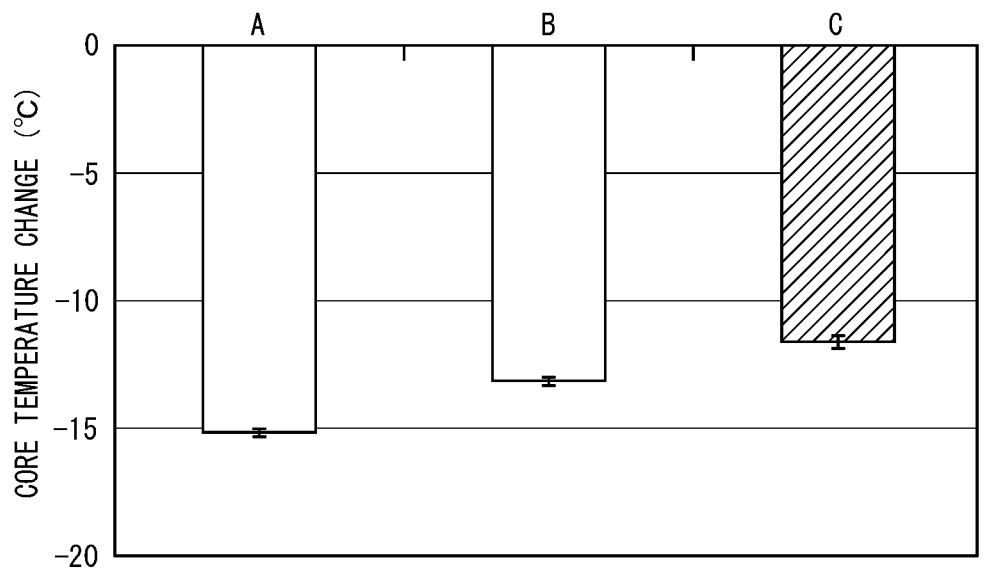
FIG. 3A is a graph illustrating temperature changes in the cushion pad in FIGS. 1A and 1B in the case of changing the number of cells of a high ventilation member.

In FIG. 3A, A is a sample with a number of cells of 20 cells per 25 mm, a density of 30 kg/m$^3$, and a thickness of about 70% of the total thickness, B is a sample with a number of cells of 45 cells per 25 mm, a density of 31 kg/m$^3$, and a thickness of about 70% of the total thickness, and C is a seat pad of a conventional product (mold urethane) without a high ventilation member.

As illustrated in FIG. 3A, in the case where the number of cells of the high ventilation member 12 in the cushion pad 11 was 45 cells or less per 25 mm (samples A and B), a significant difference indicating a temperature decrease of at least approximately 1 degree was observed, as compared with the conventional product (C) without a high ventilation member.

Figure 3B:
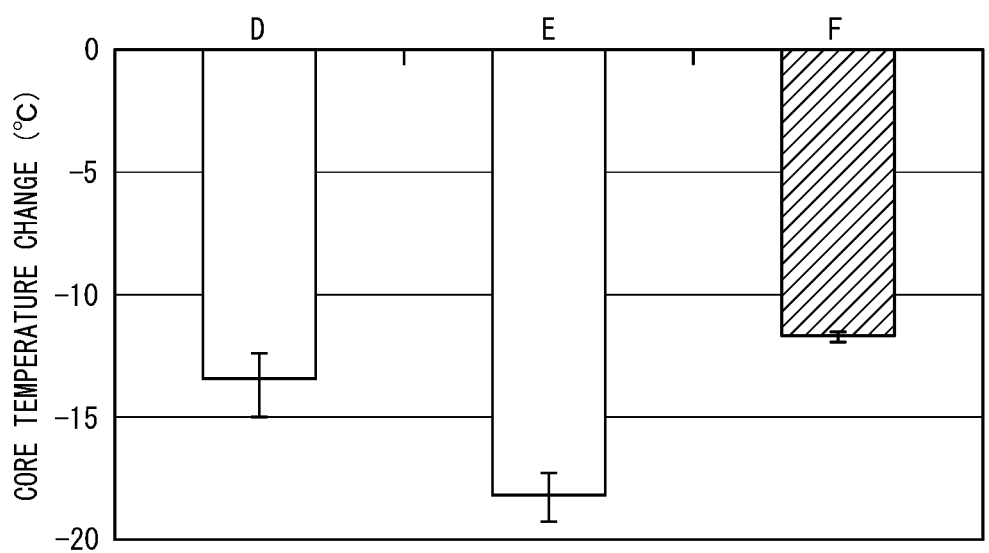
FIG. 3B is a graph illustrating temperature changes in the cushion pad in FIGS. 1A and 1B in the case of changing the thickness of the high ventilation member.

In FIG. 3B, D is a sample with a thickness of about 30% of the total thickness, a number of cells of 20 cells per 25 mm, and a density of 29 kg/m$^3$, E is a sample with a thickness of about 70% of the total thickness, a number of cells of 20 cells per 25 mm, and a density of 29 kg/m$^3$, and F is a seat pad of a conventional product (mold urethane) without a high ventilation member.

As illustrated in FIG. 3B, in the case where the thickness of the high ventilation member 12 was 20% or more of the total thickness of the cushion pad 11 and the high ventilation member 12 at the position where the high ventilation member 12 was embedded (samples D and E), a significant difference indicating a temperature decrease of at least approximately 2 degrees was observed, as compared with the seat pad (F) of the conventional product (mold urethane) without a high ventilation member.

As Comparative Examples, a sample (Comparative Example G) with a thickness of about 70% of the total thickness, a number of cells of 63 cells per 25 mm, and a density of 45 kg/m$^3$ and a sample (Comparative Example H) in which the same high ventilation member 12 as Example a is included without being exposed to the rear side of the cushion pad 11, i.e. contained within the cushion pad 11 (mold urethane), were used to examine changes in the temperature (° C.) inside the cushion pad 11 with time (min).

TABLE 3

|  |  | Time (min) | | |
| --- | --- | --- | --- | --- |
|  |  | 0 | 10 | 15 |
| Temperature (° C.) | Comparative Example G | 58.2 | 52.0 | 49.5 |
|  | Comparative Example H | 58.5 | 51.3 | 47.5 |

As can be seen from Table 3, the temperature decrease of the cushion pad 11 was 6.2 (° C.) in elapsed time 0 to 10 (min) and 2.5 (° C.) in elapsed time 10 to 15 (min) in Comparative Example G, and 7.2 (° C.) in elapsed time 0 to 10 (min) and 3.8 (° C.) in elapsed time 10 to 15 (min) in Comparative Example H. The temperature decrease after 15 (min) was 8.7 (° C.) in Comparative Example G, and 11.0 (° C.) in Comparative Example H.

That is, in the case where the number of cells was more than 45 cells per 25 mm and the density was more than 40 kg/m$^3$ (Comparative Example G has a number of cells of 63 cells per 25 mm and a density of 45 kg/m$^3$), the temperature decrease of the cushion pad 11 after 15 min was about 8.7 (° C.). This demonstrates that the temperature decreased significantly in Example a whose temperature decrease after 15 min was about 15.2 (° C.), Example b whose temperature decrease after 15 min was about 15.1 (° C.), Example c whose temperature decrease after 15 min was about 12.8 (° C.), sample A whose temperature decrease after 15 min was about 15 (° C.), sample B whose temperature decrease after 15 min was about 13 (° C.), sample D whose temperature decrease after 15 min was about 13 (° C.), and sample E whose temperature decrease after 15 min was about 18 (° C.).

In the case where the high ventilation member 12 was not exposed to the rear side of the cushion pad 11 (Comparative Example H), the temperature decrease of the cushion pad 11 after 15 min was about 11.0 (° C.). This demonstrates that the temperature decreased significantly in Example a whose temperature decrease after 15 min was about 15.2 (° C.), Example b whose temperature decrease after 15 min was about 15.1 (° C.), Example c whose temperature decrease after 15 min was about 12.8 (° C.), sample A whose temperature decrease after 15 min was about 15 (° C.), sample B whose temperature decrease after 15 min was about 13 (° C.), sample D whose temperature decrease after 15 min was about 13 (° C.), and sample E whose temperature decrease after 15 min was about 18 (° C.).

Next, an example of measuring the wobbling angle in the case of changing the position of the high ventilation member 12 in this embodiment is given in Table 4. The wobbling angle is an angle at which a load element put on a seat wobbles when the seat is vibrated. A smaller wobbling angle indicates more comfortable riding. In the measurement of the wobbling angle, a high ventilation member 12 with a density of 35 kg/m$^3$, a number of cells of 30 cells per 25 mm, a 25% hardness of 402 N/200φ (in accordance with JIS K 6400-2), and a thickness of about 70% of the total thickness in both the under thigh and the under hip was used.

In Table 4, the under thigh (through to front and rear surfaces) corresponds to the case where the high ventilation member was placed to extend through the cushion pad 11 to both of the front and rear surfaces, and the high ventilation member located in the under thigh (through to front and rear surfaces) had a density of 35 kg/m$^3$, a number of cells of 30 cells per 25 mm, and a 25% hardness of 514.5 N/200φ (in accordance with JIS K 6400-2).

TABLE 4

| | Wobbling angle (deg.) |
|---|---|
| Comparative Example X | 1.13 |
| Under Thigh (exposed only to rear side) | 1.17 |
| Under Hip (exposed only to rear side) | 1.44 |
| Under Thigh (through to front and rear surfaces) | 1.23 |

As can be seen from Table 4, in the case where the high ventilation member was located in the under thigh so as to be exposed only to the rear side of the cushion pad, a wobbling angle closer to that of Comparative Example X was maintained, and a decrease in riding comfort was suppressed. In the case where the high ventilation member was located so as to extend through the cushion pad to both of the front and rear surfaces or in the case where the high ventilation member was located in the under hip, the wobbling angle was larger, and the riding comfort decreased. Riding is more comfortable when the high ventilation member 12 is located in the under thigh than when the high ventilation member 12 is located in the under hip. Even if inserting the high ventilation member 12 in the cushion pad 11 causes uncomfortable feeling that affects the riding comfort, such uncomfortable feeling can be reduced depending on the position at which the high ventilation member 12 is inserted (e.g. the under thigh is more desirable than the under hip).

REFERENCE SIGNS LIST

10 seat pad
11 cushion pad
11*a* flat surface portion
12 high ventilation member
13 recessed space

The invention claimed is:

1. A seat pad comprising
a cushion pad configured to be a seat portion to be sat on,
wherein a high ventilation member higher in ventilation property than a cushion pad member forming the cushion pad is embedded in a part of the cushion pad except a under-hip portion configured to be located under hips when sitting, in a state of being exposed only to a rear side of the cushion pad, and
the high ventilation member extends across an entire width of a flat surface portion of the front surface of the seat pad and is not divided in a width direction of the seat pad.

2. The seat pad according to claim 1, wherein the high ventilation member is embedded only in a under-thigh portion of the cushion pad configured to be located under thighs when sitting.

3. The seat pad according to claim 1, wherein a thickness of the high ventilation member is 20% or more of a total thickness of the cushion pad and the high ventilation member at a position where the high ventilation member is embedded.

4. The seat pad according to claim 1, wherein the high ventilation member is inserted in the cushion pad in a state of being compressed in a planar view lateral direction of the high ventilation member.

5. The seat pad according to claim 1, wherein the high ventilation member is polyurethane foam subjected to membrane removal treatment.

6. The seat pad according to claim 5, wherein the polyurethane foam has a density of 20 kg/m$^3$ to 40 kg/m$^3$ and a number of cells of 45 cells or less per 25 mm.

7. The seat pad according to claim 2, wherein a thickness of the high ventilation member is 20% or more of a total thickness of the cushion pad and the high ventilation member at a position where the high ventilation member is embedded.

8. The seat pad according to claim 2, wherein the high ventilation member is inserted in the cushion pad in a state of being compressed in a planar view lateral direction of the high ventilation member.

9. The seat pad according to claim 3, wherein the high ventilation member is inserted in the cushion pad in a state of being compressed in a planar view lateral direction of the high ventilation member.

10. The seat pad according to claim 2, wherein the high ventilation member is polyurethane foam subjected to membrane removal treatment.

11. The seat pad according to claim 3, wherein the high ventilation member is polyurethane foam subjected to membrane removal treatment.

12. The seat pad according to claim 4, wherein the high ventilation member is polyurethane foam subjected to membrane removal treatment.

13. The seat pad according to claim 7, wherein the high ventilation member is inserted in the cushion pad in a state of being compressed in a planar view lateral direction of the high ventilation member.

14. The seat pad according to claim 7, wherein the high ventilation member is polyurethane foam subjected to membrane removal treatment.

15. The seat pad according to claim 8, wherein the high ventilation member is polyurethane foam subjected to membrane removal treatment.

16. The seat pad according to claim 9, wherein the high ventilation member is polyurethane foam subjected to membrane removal treatment.

17. The seat pad according to claim 13, wherein the high ventilation member is polyurethane foam subjected to membrane removal treatment.

18. The seat pad according to claim 17, wherein the polyurethane foam has a density of 20 kg/m$^3$ to 40 kg/m$^3$ and a number of cells of 45 cells or less per 25 mm.

* * * * *